United States Patent
Cauvin et al.

(10) Patent No.: US 12,524,855 B2
(45) Date of Patent: Jan. 13, 2026

(54) METHOD AND APPARATUS FOR INVERSE TONE MAPPING

(71) Applicant: InterDigital CE Patent Holdings, SAS, Paris (FR)

(72) Inventors: Laurent Cauvin, Chevaigne (FR); Marie-Jean Colaitis, Cesson-Sévigné (FR); Frederic Plissonneau, Thorigné-Fouillard (FR); Guillaume Poirier, Rennes (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 468 days.

(21) Appl. No.: 17/908,090

(22) PCT Filed: Feb. 22, 2021

(86) PCT No.: PCT/EP2021/054308
§ 371 (c)(1),
(2) Date: Aug. 30, 2022

(87) PCT Pub. No.: WO2021/175633
PCT Pub. Date: Sep. 10, 2021

(65) Prior Publication Data
US 2023/0017160 A1   Jan. 19, 2023

(30) Foreign Application Priority Data
Mar. 2, 2020 (EP) ..................................... 20305220

(51) Int. Cl.
*G06T 5/92* (2024.01)
(52) U.S. Cl.
CPC ...... *G06T 5/92* (2024.01); *G06T 2207/20208* (2013.01)

(58) Field of Classification Search
CPC .... G06T 5/92; G06T 2207/20208; G06T 5/40
See application file for complete search history.

(56) References Cited

U.S. PATENT DOCUMENTS

| 10,397,576 B2 | 8/2019 | Kadu et al. |
| 11,263,731 B2 * | 3/2022 | Thebault ................... G06T 5/92 |

(Continued)

FOREIGN PATENT DOCUMENTS

| CN | 106603941 A | 4/2017 |
| EP | 3249605 A1 | 11/2017 |

(Continued)

OTHER PUBLICATIONS

Banterle, Francesco, et al. "High dynamic range imaging and low dynamic range expansion for generating HDR content." Computer graphics forum. vol. 28. No. 8. Oxford, UK: Blackwell Publishing Ltd, 2009. (Year: 2009).*

(Continued)

*Primary Examiner* — Andrae S Allison
(74) *Attorney, Agent, or Firm* — Condo Roccia Koptiw LLP

(57) ABSTRACT

A method for inverse tone mapping includes obtaining a histogram of a low dynamic range image, called LDR image and obtaining an ITMO function, allowing obtaining a pixel value of a High Dynamic Range image, called HDR image, from a pixel value of the LDR image and a gain function depending on said pixel value of the LDR image. A search process is applied using the obtained histogram to identify areas of the LDR image producing bright areas in the HDR image when the ITMO function is applied on said LDR image. Information representative of the bright areas is used to determine when modifying the gain function to ensure the HDR image respects at least one predefined light energy constraint.

15 Claims, 8 Drawing Sheets

(56) References Cited

U.S. PATENT DOCUMENTS

| | | | |
|---|---|---|---|
| 2017/0193639 A1 | 7/2017 | Dai et al. | |
| 2017/0374262 A1* | 12/2017 | Nagano | G09G 5/10 |
| 2018/0007356 A1 | 1/2018 | Kadu et al. | |
| 2018/0082661 A1 | 3/2018 | Kang et al. | |
| 2018/0247396 A1* | 8/2018 | Pouli | G06T 7/90 |
| 2018/0300921 A1* | 10/2018 | Aiba | G06T 5/92 |
| 2018/0374202 A1* | 12/2018 | Cauvin | G06T 5/92 |
| 2019/0147572 A1* | 5/2019 | Colaitis | G06T 5/92 |
| | | | 345/589 |
| 2019/0208173 A1* | 7/2019 | Kadu | H04N 19/154 |
| 2019/0236761 A1 | 8/2019 | Cauvin et al. | |
| 2020/0302659 A1* | 9/2020 | Urabe | G06T 5/92 |
| 2021/0360253 A1* | 11/2021 | Ferrara | H04N 19/184 |
| 2022/0092749 A1* | 3/2022 | Johnson | H04N 23/611 |

FOREIGN PATENT DOCUMENTS

| | | |
|---|---|---|
| EP | 3306563 A1 | 4/2018 |
| JP | 2000101840 A | 4/2000 |
| JP | 2019165434 A | 9/2019 |
| KR | 20180032750 A | 4/2018 |
| WO | WO 2019125857 A1 | 6/2019 |

OTHER PUBLICATIONS

Enhong, Zhu, et al., "Method of Generating High Dynamic Range Image from a Single Image", Journal of Computer-Aided Design & Computer Graphics, vol. 28 No. 10, Oct. 2016, 10 pages.

* cited by examiner

METHOD AND APPARATUS FOR INVERSE TONE MAPPING

CROSS REFERENCE TO RELATED APPLICATIONS

This application is a U.S. National Stage Application under 35 U.S.C. 371 of International Patent Application No. PCT/EP2021/054308, filed Feb. 22, 2021, which is incorporated herein by reference in its entirety.

This application claims the benefit of European Patent Application No. 20305220.4, filed Mar. 2, 2020.

1. TECHNICAL FIELD

At least one of the present embodiments generally relates to the field of high dynamic range imaging and in particular to a method and an apparatus for expanding a dynamic range of a low or standard dynamic range image.

2. BACKGROUND

Recent advancements in display technology are beginning to allow for an extended dynamic range of color, luminance and contrast in images to be displayed. The term image refers here to an image content that can be for example a video or a still picture or image.

Technologies allowing for an extended dynamic range in luminance or brightness of images are known as high dynamic range (HDR) imaging. Although a number of HDR display devices have appeared, as well as image cameras capable of capturing images with an increased dynamic range, there is still a very limited number of HDR contents available. Solutions allowing extending the dynamic range of existing contents so that these contents can be displayed efficiently on HDR display devices are needed.

To prepare conventional (hereon referred to as LDR for low dynamic range or as SDR for Standard dynamic range) content for HDR display devices, reverse or inverse tone mapping operators (ITMO) can be employed. ITMOs allow to generate HDR images from conventional (LDR or SDR) images, by using algorithms that process the luminance information of pixels in the images with the aim of recovering or recreating an appearance of a corresponding original scene. Typically, ITMOs take a conventional image as input, expand the luminance range of colors of this image in a global manner, and subsequently process highlights or bright regions locally to enhance an HDR appearance of colors in the image.

Although several ITMO solutions exist, they generally focus at perceptually reproducing the appearance of the original scene and rely on strict assumptions about the content. Additionally, most expansion methods proposed in the literature are optimized towards extreme increases in dynamic range.

Typically, HDR imaging is defined by an extension in dynamic range between dark and bright values of luminance of colors combined with an increase in the number of quantization steps. To achieve more extreme increases in dynamic range, many methods combine a global expansion with local processing steps that enhance the appearance of highlights and other bright regions of images. Known global expansion steps proposed in the literature vary from inverse sigmoid, to linear or piecewise linear.

To enhance bright local features in an image, it is known to create a luminance expansion map, wherein each pixel of the image is associated with an expansion value to apply to the luminance of this pixel. In the simplest case, clipped regions in the image can be detected and then expanded using a steeper expansion curve, however such a solution does not offer sufficient control over the appearance of the image.

It is desirable to overcome the above drawbacks.

It is particularly desirable to improve an inverse tone mapping method allowing improving the control of the appearance of HDR images generated from conventional (LDR or SDR) images. It is also particularly desirable to design a novel ITMO having a reasonable complexity.

3. BRIEF SUMMARY

In a first aspect, one or more of the present embodiments provide a method comprising:

obtaining an histogram representative of a low dynamic range image, called LDR image; obtaining an inverse tone mapping operator function, called ITMO function, allowing obtaining a pixel value of an High Dynamic Range image, called HDR image, from a pixel value of the LDR image and a gain function depending on said pixel value of the LDR image; applying a search process using the obtained histogram to identify areas of the LDR image producing bright areas in the HDR image when the ITMO function is applied on said LDR image, the search process comprising: defining subparts of the histogram, called bands, and calculating a contribution and a number of pixels, called population, of each band, each contribution being representative of a light energy after application of the ITMO function emitted by pixels represented by said band; identifying at least one local maximum in the contributions and for each local maximum, aggregating the corresponding band, called candidate, with neighboring bands; identifying at least one local maximum in the populations and for each local maximum, aggregating the corresponding band, called candidate population, with neighboring bands; creating an aggregated candidate from each aggregated candidate population that is independent of any aggregated candidate; selecting at least one final aggregated candidate from the aggregated candidates in function of information representative of each aggregated candidate comprising an information representative of a light energy emitted by pixels represented by said aggregated candidate and of the number of pixels represented by said aggregated candidate; and, applying a determination process using the final aggregated candidate to determine when modifying the gain function to insure the HDR image respects at least one predefined light energy constraint.

In an embodiment, the pixel value is a luminance value.

In an embodiment, the at least one predefined light constraint comprises a MaxFall constraint and/or a diffuse white constraint.

In an embodiment, the selection of the at least one final aggregated candidate comprises: selecting a subset of aggregated candidates associated with the highest value of information representative of a light energy, the at least one final aggregated candidate being selected from the aggregated candidates of the subset representing the highest number of pixels.

In an embodiment, the determination process comprises:

determining a pixel value, called final pixel value, representative of the at least one final aggregated candidate; computing a value representative of an expanded pixel value from the final pixel value using the ITMO function; and, executing a modification process adapted to modify the gain function when the expanded pixel value is higher than a light energy constraint representing a predefined diffuse white constraint value.

In an embodiment, the SDR image is a current image of a sequence of images and the final pixel value is temporally filtered using at least one final pixel value computed for at least one image preceding the current image in the sequence of images.

In an embodiment, the determination process comprises: executing a modification process adapted to modify the gain function when a value representative of a MaxFall of the HDR image is higher than a light energy constraint representing a predefined MaxFall constraint.

In an embodiment, the value representative of a MaxFall of the HDR image is a sum of the calculated contributions.

In a second aspect, one or more of the present embodiments provide a device wherein the device comprises electronic circuitry adapted for:

obtaining an histogram representative of a low dynamic range image, called LDR image; obtaining an inverse tone mapping operator function, called ITMO function, allowing obtaining a pixel value of an High Dynamic Range image, called HDR image, from a pixel value of the LDR image and a gain function depending on said pixel value of the LDR image; applying a search process using the obtained histogram to identify areas of the LDR image producing bright areas in the HDR image when the ITMO function is applied on said LDR image, the search process comprising: defining subparts of the histogram, called bands, and calculating a contribution and a number of pixels, called population, of each band, each contribution being representative of a light energy after application of the ITMO function emitted by pixels represented by said band; identifying at least one local maximum in the contributions and for each local maximum, aggregating the corresponding band, called candidate, with neighboring bands; identifying at least one local maximum in the populations and for each local maximum, aggregating the corresponding band, called candidate population, with neighboring bands; creating an aggregated candidate from each aggregated candidate population that is independent of any aggregated candidate; selecting at least one final aggregated candidate from the aggregated candidates in function of information representative of each aggregated candidate comprising an information representative of a light energy emitted by pixels represented by said aggregated candidate and of the number of pixels represented by said aggregated candidate; and, applying a determination process using the final aggregated candidate to determine when modifying the gain function to insure the HDR image respects at least one predefined light energy constraint.

In an embodiment, the pixel value is a luminance value.

In an embodiment, the at least one predefined light constraint comprises a MaxFall constraint and/or a diffuse white constraint.

In an embodiment, for selecting at least one final aggregated candidate, the device is further adapted for: selecting a subset of aggregated candidates associated with the highest value of information representative of a light energy, the at least one final aggregated candidate being selected from the aggregated candidates of the subset representing the highest number of pixels.

In an embodiment, for applying the determination process, the device is further adapted for: determining a pixel value, called final pixel value, representative of the at least one final aggregated candidate; computing an value representative of an expended pixel value from the final pixel value using the ITMO function; and, executing a modification process adapted to modify the gain function when the expanded pixel value is higher than a light energy constraint representing a predefined diffuse white constraint value.

In an embodiment, the SDR image is a current image of a sequence of images and the final pixel value is temporally filtered using at least one final pixel value computed for at least one image preceding the current image in the sequence of images.

In an embodiment, for applying the determination process, the device is further configured for: executing a modification process adapted to modify the gain function when a value representative of a MaxFall of the HDR image is higher than a light energy constraint representing a predefined MaxFall constraint.

In an embodiment, the value representative of a MaxFall of the HDR image is a sum of the calculated contributions.

In a third aspect, one or more of the present embodiments provide an apparatus comprising a device according to the second aspect.

In a fourth aspect, one or more of the present embodiments provide a signal generated by the method of the first aspect or by the device of the second aspect or by the apparatus of the third aspect.

In a fifth aspect, one or more of the present embodiments provide computer program comprising program code instructions for implementing the method according to the first aspect.

In a sixth aspect, one or more of the present embodiments an information storage means storing program code instructions for implementing the method according to the first aspect.

4. BRIEF SUMMARY OF THE DRAWINGS

5. DETAILED DESCRIPTION

Figure 1:
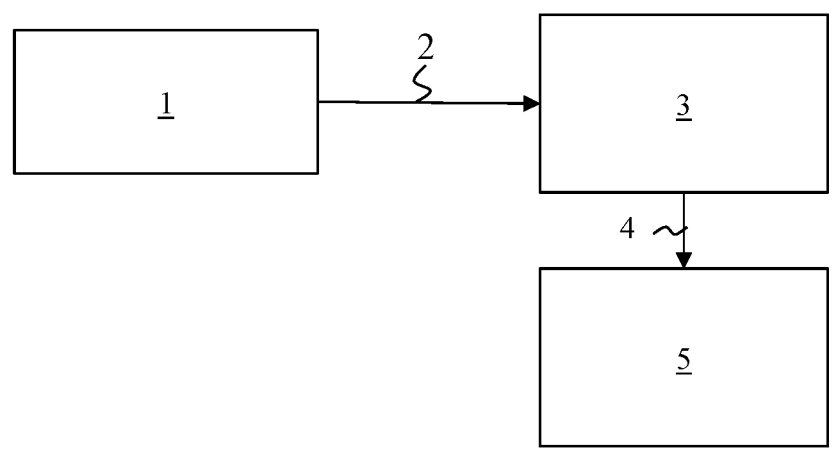
FIG. 1 illustrates an example of context in which embodiments described in the following could be implemented.

Different kinds of inverse tone mapping methods exist. For example, in the field of local tone mapping algorithms, the patent application WO2015/096955 discloses a method comprising, for each pixel P of an image, a step of obtaining a pixel expansion exponent value E(P) and then a step of inverse tone mapping the luminance Y(P) of the pixel P into an expanded luminance value $Y_{exp}(P)$ as follows.

$$Y_{exp}(P)=Y(P)^{E(P)}\times[Y_{enhance}(P)] \quad \text{(eq. 1)}$$

Where:
- $Y_{exp}(P)$ is the expanded luminance value of the pixel P.
- Y(P) is the luminance value of the pixel P within the SDR (or LDR) input image.
- $Y_{enhance}(P)$ is a luminance enhancement value for the pixel P within the SDR (or LDR) input image.
- E (P) is a pixel expansion exponent value for the pixel P.

The set of values E(P) for all pixels of an image form an expansion exponent map or expansion map or expansion function or gain function, for the image. This expansion exponent map can be generated by different methods. For example, a method consists in low-pass filtering the luminance value Y(P) of each pixel P to obtain a low-pass filtered luminance value $Y_{low}(P)$ and applying a quadratic function to the low-pass filtered luminance value, said quadratic function being defined by parameters a, b and c according to the following equation:

$$E(P)=a[Y_{low}(P)]^2+b[Y_{low}(P)]+c$$

Another method based on WO2015/096955 facilitating a hardware implementation uses the following equation:

$$Y_{exp}(P)=(Y_{low}(P))^{(E(Y_{low}(P))-d)}\times Y^d$$

The above equation can be expressed as follows:

$$Y_{exp}(P) = (Y_{low}(P))^{E(Y_{low}(P))} \times \left(\frac{Y(P)}{Y_{low}(P)}\right)^d$$

where the parameter d can be set for instance to d=1.25. $Y_{enhance}(P)$ in this case is a function of both the image luminance value Y(P) and the low-pass version of said luminance value $Y_{low}(P)$.

The document ITU-R BT.2446-0 exposes a method for converting SDR contents to HDR contents by using the same kind of formula:

$$Y'_{exp}(P)=Y''(P)^{E(Y''(P))}$$

wherein
- Y' is in the [0 . . . 1] range
- Y"=255.0×Y'
- $E=a_1Y''^2+b_1Y''+c_1$ when Y"≤T
- $E=a_2Y''^2+b_2Y''+c_2$ when Y">T
- T=70
- $a_1$=1.8712e-5, $b_1$=−2.7334e-3, $c_1$=1.3141
- $a_2$=2.8305e-6, $b_2$=−7.4622e-4, $c_2$=1.2528

As can be seen from the above, the expansion is based on a power function whose exponent depends on the luminance value of the current pixel, or on a filtered version of this luminance value.

More generally, all the global expansion methods can be expressed as an ITM function of the following form for all input values different from zero (for zero at the input, the output is logically zero):

$$Y_{exp}=Y^{G(Y)} \quad \text{(eq. 2)}$$

where G( ) is a gain function of Y.

In the same way, all local expansion methods can be expressed in the following way for all input values different from zero:

$$Y_{exp}=Y_F^{G(Y_F)}Y_{enhance}(Y,Ys_i) \quad \text{(eq. 3)}$$

where $Y_F$ is a filtered version of Y, G( ) is a gain function of $Y_F$ and $Y_{enhance}$ is a function of Y and its surrounding pixels $Y_{S_i}$.

In both cases (global or local), the expansion function is monotonic, in order to be consistent with the input SDR image.

Some inverse tone mapping methods use a gain function G( ) (also called expansion function) based on predetermined expansion parameters (as described for example in the ITU-R BT.2446-0 document) without any adaptation to image content. The patent application EP3249605 discloses a method for inverse tone mapping of an image that can adapt automatically to the image content to tone-map. The method uses a set of profiles forming a template. These profiles are predetermined in a learning phase that is an offline processing. Each profile is defined by a visual feature, such as a luminance histogram, to which a gain function is associated.

In the learning phase, the profiles are determined from a large number of reference images that are manually graded by colorists, who manually set the inverse tone mapping parameters and generate the gain functions for these images. Then the reference images are clustered based on these generated gain functions. Each cluster is processed in order to extract a representative histogram of luminance and a representative gain function associated thereto, thus forming a profile issued from said cluster.

When a new SDR content is received, histograms are determined for SDR images of the SDR content. Each computed histogram is then compared to each of the histograms saved in the template, issued from the learning phase, in order to find the best match histogram of the template. For example, a distance between a computed histogram and each of the histograms saved in the template is calculated. Then the gain function related to the histogram of the template giving the best match with the computed histogram is selected and used to perform inverse tone mapping on the image (or images) corresponding to the computed histogram. In this way, the best gain function of the template adapted to an SDR image is applied to output a corresponding HDR image.

Nevertheless, even with the best gain function, and a fortiori with a fixed gain function, a bad grading is obtained for some luminance ranges in some specific images. In particular, highlights or bright parts on wide areas in SDR images can result in areas that are too bright in HDR images. Consequently, some HDR display devices can't be able to display correctly these HDR images because they exceed their power capacity. To deal with such HDR images, some display devices apply a more or less efficient algorithm to reduce locally or globally the brightness of the HDR images. This capacity of the display is called the MaxFall of the display, is expressed in nits (i.e. candela/$m^2$ (cd/$m^2$)) and can be defined as a maximum Frame Average Light Level (i.e. maximum average luminance level of an image). MaxFall can also be thought on the viewer side: large bright areas can dazzle the viewer or at least make its HDR image viewing experience unpleasant.

On an another side, some recommendations, as the one in the document ITU-R BT.2408-1, have appeared which especially introduce a notion of Reference Level or Diffuse White of "203" nits for PQ (Perceptual quantization) method based production and for HLG (Hybrid log-gamma) method based production on a "1000" cd/m2 (nominal peak luminance) display, under controlled studio lighting. The reader can refer to recommendation ITU-R BT.2100 for more precision on HLG and PQ methods. The signal level of HDR Reference White is specified to be not related to the signal level of SDR "peak white". On another side, annex "2" of document ITU-R BT.2408-1, whose purpose is an analysis of reference levels in a first set of images extracted from an HLG-based live broadcast and in a second set of test images, concludes that:

"The HDR Reference White level of 203 cd/m2 in Table 1 of this Report is consistent with the mean diffuse white as measured in the content analyzed in this Annex. However, the standard deviation of diffuse white in two different sources of content are large, indicating a significant spread of diffuse white around the mean".

These standard deviations translate (for an assumed "1000" cd/m2 signal) to a range between around "123" and "345" cd/m2 (i.e. mean±one standard deviation) for the first set, and a range between around "80" and "700" cd/m2 (i.e. mean±one standard deviation) for the second set. That means that this notion of diffuse white is a difficult concept to address, and its level value can largely vary depending on the content.

At least one of the following embodiments aims to improve inverse tone mapping of at least one input SDR image by:

1. ensuring that the MaxFall of the expanded output HDR image, or at least the bright areas part of the MaxFall, will not exceed (or will be close to) a pre-defined MaxFall value; and/or 2. tracking down in the output HDR image the large bright area which is likely to be the diffuse white area and (if so) ensuring that its mean luminance value is, depending on its size, close to a pre-defined target diffuse white value, provided that this mean luminance value is higher than the pre-defined target diffuse white value.

The MaxFall constraint and the Diffuse White constraint can be viewed as light energy constraint of the output HDR image.

Consequently, the invention aims to reduce the overall brightness of an expanded HDR image depending on its content, not to raise it.

FIG. 1 illustrates an example of context in which embodiments described in the following could be implemented.

In FIG. 1, a device 1, that could be a camera, a storage device, a computer or any device capable of delivering a SDR content, transmits a SDR content to a system 3 using a communication channel 2. The communication channel 2 could be a wired (for example Ethernet) or a wireless (for example WiFi, 3G, 4G or 5G) network link.

The SDR content comprises a fixed image or a video sequence.

The system 3 converts the SDR content to an HDR content, i.e. applies an inverse tone mapping to the SDR content to obtain an HDR content.

The obtained HDR content is then transmitted to a display system 5 using a communication channel 4, that could be a wired or wireless network. The display device then displays the HDR content.

In an embodiment, the system 3 is comprised in the display system 5.

In an embodiment, the device 1, the system 3 and the display device 5 are all comprised in a same system.

In an embodiment, the display system 5 is replaced by a storage device that stores the HDR content.

Figure 2:
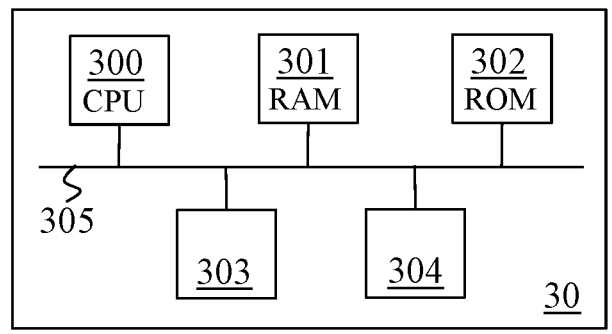
FIG. 2 illustrates schematically an example of hardware architecture of a processing module able to implement various aspects and embodiments.

FIG. 2 illustrates schematically an example of hardware architecture of a processing module 30 comprised in the system 3 and able to implement different aspects and embodiments. The processing module 30 comprises, connected by a communication bus 305: a processor or CPU (central processing unit) 300 encompassing one or more microprocessors, general purpose computers, special purpose computers, and processors based on a multi-core architecture, as non-limiting examples; a random access memory (RAM) 301; a read only memory (ROM) 302; a storage unit 303, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive, or a storage medium reader, such as a SD (secure digital) card reader and/or a hard disc drive (HDD) and/or a network accessible storage device; at least one communication interface 304 for exchanging data with other modules, devices, systems or equipments. The communication interface 304 can include, but is not limited to, a transceiver configured to transmit and to receive data over a communication channel. The communication interface 304 can include, but is not limited to, a modem or network card.

The communication interface 304 enables for instance the processing module 30 to receive a SDR content and to provide a HDR content.

The processor 300 is capable of executing instructions loaded into the RAM 301 from the ROM 302, from an external memory (not shown), from a storage medium, or from a communication network. When the processing module 30 is powered up, the processor 300 is capable of reading instructions from the RAM 301 and executing them. These instructions form a computer program causing, for example, the implementation by the processor 300 of an inverse tone mapping method described in the following in relation to FIG. 4.

All or some of the algorithms and steps of said inverse tone mapping method may be implemented in software form by the execution of a set of instructions by a programmable machine such as a DSP (digital signal processor) or a microcontroller, or be implemented in hardware form by a machine or a dedicated component such as a FPGA (field-programmable gate array) or an ASIC (application-specific integrated circuit).

Figure 3:
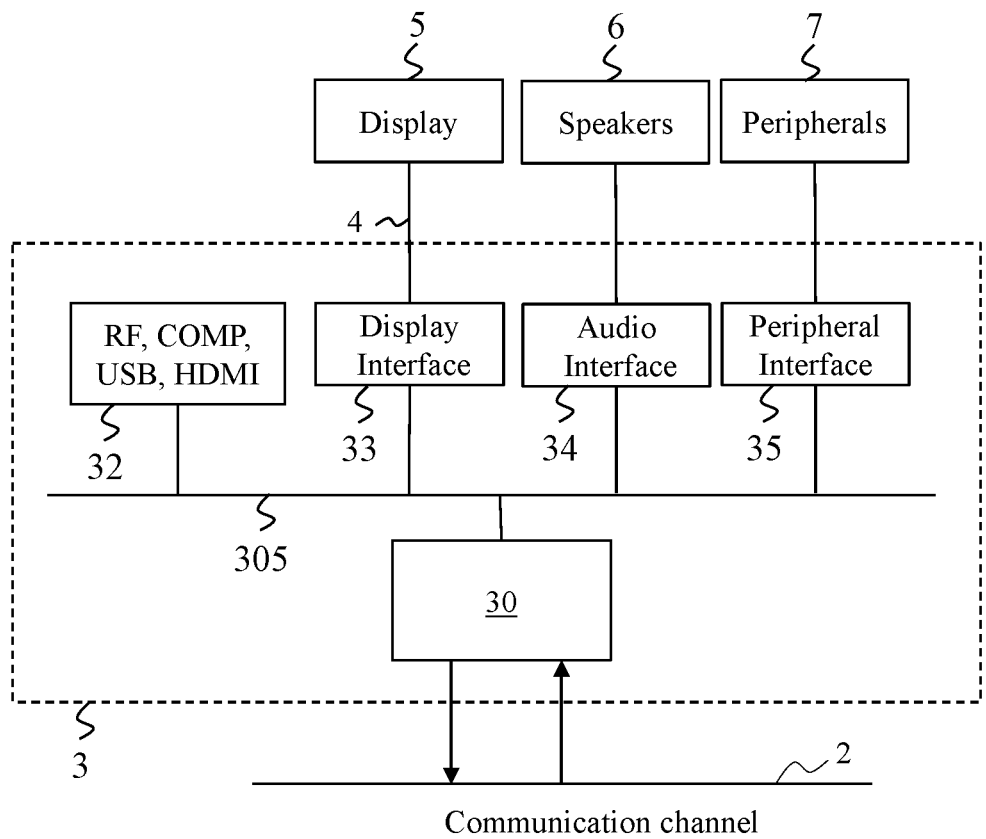
FIG. 3 illustrates a block diagram of an example of a system in which various aspects and embodiments are implemented.

FIG. 3 illustrates a block diagram of an example of the system 3 in which various aspects and embodiments are implemented. System 3 can be embodied as a device including the various components described below and is configured to perform one or more of the aspects and embodiments described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 3, singly or in combination, can be embodied in a single integrated circuit (IC), multiple ICs, and/or discrete components. For example, in at least one embodiment, the system 3 comprises one processing module 30 that implement the inverse tone mapping method. In various embodiments, the system 3 is communicatively coupled to one or more other systems, or other electronic devices, via, for example, a communications bus or through dedicated input and/or output ports.

The input to the processing module 30 can be provided through various input modules as indicated in block 32. Such input modules include, but are not limited to, (i) a radio frequency (RF) module that receives an RF signal transmitted, for example, over the air by a broadcaster, (ii) a component (COMP) input module (or a set of COMP input modules), (iii) a Universal Serial Bus (USB) input module, and/or (iv) a High Definition Multimedia Interface (HDMI) input module. Other examples, not shown in FIG. 3, include composite video.

In various embodiments, the input modules of block 32 have associated respective input processing elements as known in the art. For example, the RF module can be associated with elements suitable for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which can be referred to as a channel in certain embodiments, (iv) demodulating the down-converted and band-limited signal, (v) performing error correction, and (vi) demultiplexing to select the desired stream of data packets. The RF module of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, down-converting the received signal to a lower frequency (for example, an intermediate frequency or a near-baseband frequency) or to baseband. In one set-top box embodiment, the RF module and its associated input processing element receives an RF signal transmitted over a wired (for example, cable) medium, and performs frequency selection by filtering, down-converting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF module includes an antenna.

Additionally, the USB and/or HDMI modules can include respective interface processors for connecting system 3 to other electronic devices across USB and/or HDMI connections. It is to be understood that various aspects of input processing, for example, Reed-Solomon error correction, can be implemented, for example, within a separate input processing IC or within the processing module 30 as necessary. Similarly, aspects of USB or HDMI interface processing can be implemented within separate interface ICs or within the processing module 30 as necessary. The demodulated, error corrected, and demultiplexed stream is provided to the processing module 30.

Various elements of system 3 can be provided within an integrated housing. Within the integrated housing, the various elements can be interconnected and transmit data therebetween using suitable connection arrangements, for example, an internal bus as known in the art, including the Inter-IC (12C) bus, wiring, and printed circuit boards. For example, in the system 3, the processing module 30 is interconnected to other elements of said system 3 by the bus 305.

The communication interface 304 of the processing module 30 allows the system 3 to communicate on the communication channel 2. The communication channel 2 can be implemented, for example, within a wired and/or a wireless medium.

Data is streamed, or otherwise provided, to the system 3, in various embodiments, using a wireless network such as a Wi-Fi network, for example IEEE 802.11 (IEEE refers to the Institute of Electrical and Electronics Engineers). The Wi-Fi signal of these embodiments is received over the communications channel 2 and the communications interface 304 which are adapted for Wi-Fi communications. The communications channel 3 of these embodiments is typically connected to an access point or router that provides access to external networks including the Internet for allowing streaming applications and other over-the-top communications. Other embodiments provide streamed data to the system 3 using a set-top box that delivers the data over the HDMI connection of the input block 32. Still other embodiments provide streamed data to the system 3 using the RF connection of the input block 32. As indicated above, various embodiments provide data in a non-streaming manner. Additionally, various embodiments use wireless networks other than Wi-Fi, for example a cellular network or a Bluetooth network.

The system 3 can provide an output signal to various output devices, including the display 5, speakers 6, and other peripheral devices 7. The display 5 of various embodiments includes one or more of, for example, a touchscreen display, an organic light-emitting diode (OLED) display, a curved display, and/or a foldable display. The display 5 can be for a television, a tablet, a laptop, a cell phone (mobile phone), or other devices. The display 5 can also be integrated with other components (for example, as in a smart phone), or separate (for example, an external monitor for a laptop). The display device 5 is HDR content compatible. The other peripheral devices 7 include, in various examples of embodiments, one or more of a stand-alone digital video disc (or digital versatile disc) (DVR, for both terms), a disk player, a stereo system, and/or a lighting system. Various embodiments use one or more peripheral devices 7 that provide a function based on the output of the system 3. For example, a disk player performs the function of playing the output of the system 3.

In various embodiments, control signals are communicated between the system 3 and the display 5, speakers 6, or other peripheral devices 7 using signaling such as AV.Link, Consumer Electronics Control (CEC), or other communications protocols that enable device-to-device control with or without user intervention. The output devices can be communicatively coupled to system 3 via dedicated connections through respective interfaces 33, 34, and 35. Alternatively, the output devices can be connected to system 3 using the communications channel 2 via the communications interface 304. The display 5 and speakers 6 can be integrated in a single unit with the other components of system 3 in an electronic device such as, for example, a television. In various embodiments, the display interface 5 includes a display driver, such as, for example, a timing controller (T Con) chip.

The display 5 and speaker 6 can alternatively be separate from one or more of the other components, for example, if the RF module of input 32 is part of a separate set-top box. In various embodiments in which the display 5 and speakers 6 are external components, the output signal can be provided via dedicated output connections, including, for example, HDMI ports, USB ports, or COMP outputs.

Various implementations involve applying an inverse tone mapping method. The inverse tone mapping, as used in this application, can encompass all or part of the processes performed, for example, on a received SDR image or video stream in order to produce a final HDR output suitable for display. In various embodiments, such processes include one or more of the processes typically performed by an image or a video decoder, for example, a JPEG decoder or an H.264/

AVC (ISO/IEC 14496-10-MPEG-4 Part 10, Advanced Video Coding), H.265/HEVC (ISO/IEC 23008-2-MPEG-H Part 2, High Efficiency Video Coding/ITU-T H.265) or and H.266/VVC (Versatile Video Coding) under development by a joint collaborative team of ITU-T and ISO/IEC experts known as the Joint Video Experts Team (JVET)) decoder.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented, for example, in a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, retrieving the information from memory or obtaining the information for example from another device, module or from user.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", "one or more of" for example, in the cases of "A/B", "A and/or B" and "at least one of A and B", "one or more of A and B" is intended to encompass the selection of the first listed option (A) only, or the selection of the second listed option (B) only, or the selection of both options (A and B). As a further example, in the cases of "A, B, and/or C" and "at least one of A, B, and C", "one or more of A, B and C" such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

As will be evident to one of ordinary skill in the art, implementations or embodiments can produce a variety of signals formatted to carry information that can be, for example, stored or transmitted. The information can include, for example, instructions for performing a method, or data produced by one of the described implementations or embodiments. For example, a signal can be formatted to carry the HDR image or video sequence of a described embodiment. Such a signal can be formatted, for example, as an electromagnetic wave (for example, using a radio frequency portion of spectrum) or as a baseband signal. The formatting can include, for example, encoding an HDR image or video sequence in an encoded stream and modulating a carrier with the encoded stream. The information that the signal carries can be, for example, analog or digital information. The signal can be transmitted over a variety of different wired or wireless links, as is known. The signal can be stored on a processor-readable medium.

Figure 4:
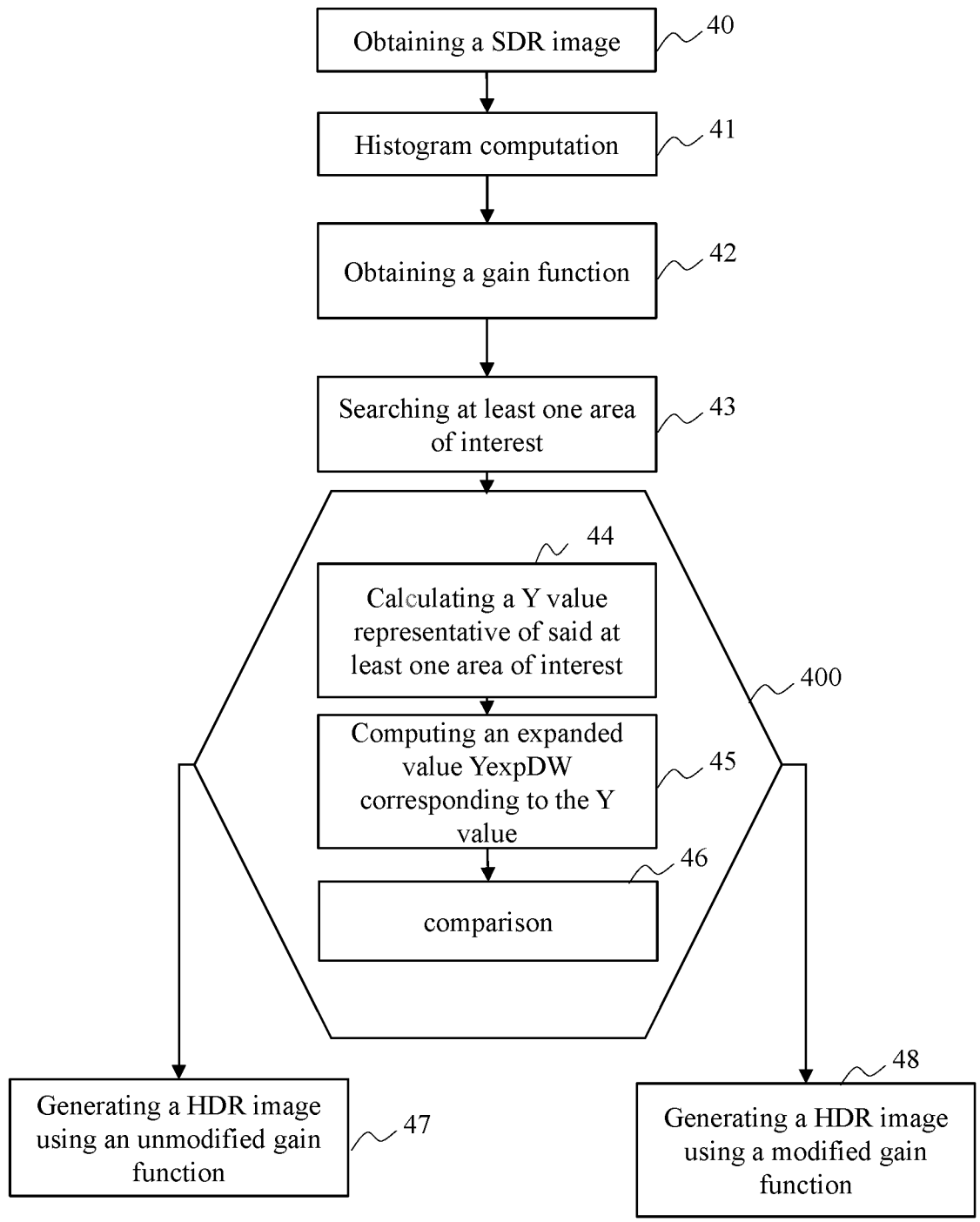
FIG. 4 illustrates schematically a high-level representation of various first embodiments of a method of improving an inverse tone mapping.

FIG. 4 illustrates schematically a high-level representation of various first embodiments of a method of inverse tone mapping. An objective of the embodiments of FIG. 4 is to respect a diffuse white constraint.

In FIG. 4, the inverse tone mapping method is executed by the processing module 30.

In a step 40, the processing module 30 obtains a current input SDR image. The current input SDR image is either a still image or an image of a video sequence. In the following, it is assumed that a gain function G( ) (as shown in equations 2 and 3) has been defined for the current input SDR image. A goal of at least one of the following embodiments is to modify a gain curve G corresponding to this gain function G( ) (or equivalently to modify the gain function GO) to adapt it to a diffuse white constraint.

In a step 41, the processing module 30 computes an histogram representative of the current input SDR image (for example the histogram is computed directly on the current input SDR image or on a filtered version of the current input SDR image). The histogram of the current input SDR image is used to identify bright areas of interest, that are called lobes in the following. The current input SDR image is supposed to be gammatized (non linear).

In an embodiment, the histogram comprises a number nbOfBins of bins, nbOfBins being an integer for example multiple of "64". For example, nbOfBins=256.

As an example, in the rest of the document, a target LMax (i.e. the target highest luminance value) of the ITMO is "1000" nits, and the current input SDR image is supposed to be a "10" bits image, with the value "1023" corresponding to 100 nits. Note that "10" bits have been chosen to illustrate the method, but if "8" bits images are used, then a simple scaling by "4" should be applied.

In that case, the ITMO function can be written as follows:

$$Y_{HDR}' = Y_{SDR}'^{G(Y_{SDR}')} \quad \text{(eq. 4)}$$

where $Y_{SDR}'$ is a luminance value of the current input SDR image and $Y_{HDR}'$ is a luminance value of the output HDR image. The luminance value $Y_{SDR}'$, whatever its number of bits, is normalized in the range [0; 255]. In the same way, if LMax is "1000" nits, the luminance value $Y_{HDR}'$, whatever its number of bits, is normalized in the range [0; 1000].

Both $Y_{SDR}'$ and $Y_{HDR}'$ are gammatized and both $Y_{SDR}$ and $Y_{HDR}$ are linear, e.g.:

$$Y_{SDR} = (Y_{SDR}'/255)^{2.4} \times 100$$

$$Y_{HDR} = (Y_{HDR}'/1000)^{2.4} \times 1000$$

In a step 42, the processing module 30 obtains the gain function G( ). Once obtained, the gain function G( ) allows obtaining an ITM curve from the ITMO function of equation 4.

Figure 9A:
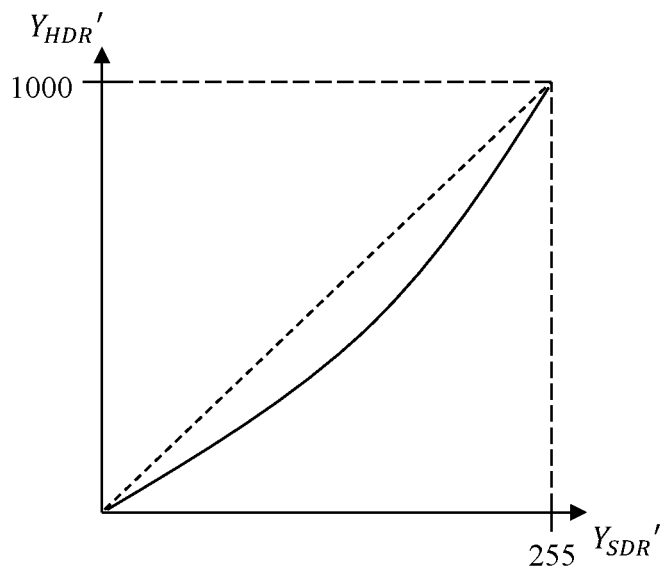
FIGS. 9A, 9B and 9C represent three different ITM curves.
Figure 9B:
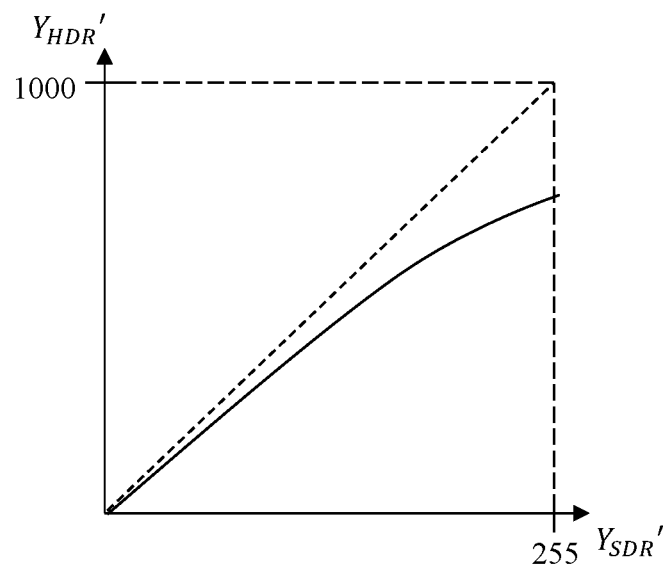
Figure 9C:
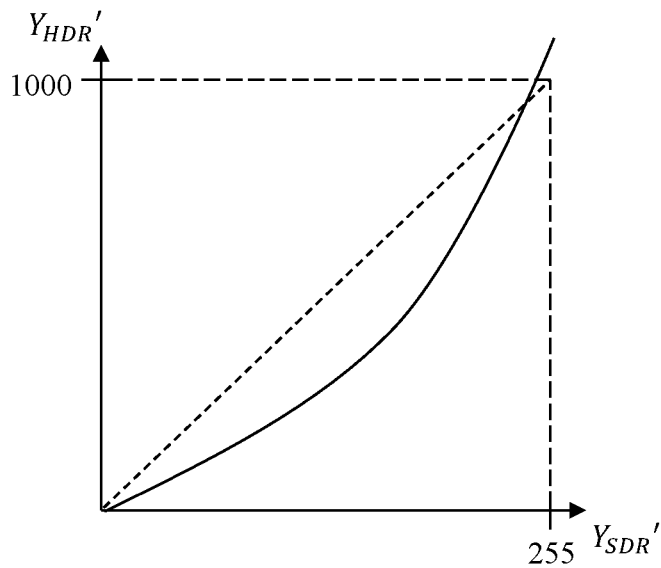

FIGS. 9A, 9B and 9C represent three examples of ITM curves targeting a "1000" nits display obtained with equation 4. The SDR input is in the range [0 . . . 255] (which means that it must be normalized in the range [0; 255] if it is not an "8" bits image), and the output in the range [0; 1000]. The curve of FIG. 9A shows that the maximum input value "255" (corresponding to "100" nits SDR) produces an output equal to "1000" that when linearized is "1000" nits. The curve of FIG. 9B shows that the maximum value is around "700", which corresponds to "425" nits when linearized, and the curve of FIG. 9C shows a maximum value around "1200" which corresponds to "1550" nits when linearized.

One can remark from FIGS. 9A, 9B and 9C that if the SDR image is a white one (the luminance value of all pixels is "1023" if the SDR image is a "10" bits image), then the MaxFall of the HDR image corresponding to FIG. 9A is "1000" nits, the MaxFall of the HDR image corresponding to FIG. 9B is "425" nits and the MaxFall of the HDR image corresponding to FIG. 9C is "1550" nits.

In a step 43, the processing module 30 applies a search process intended to identify areas of the current input SDR image which produce lobes (i.e. bright areas of interest) in the output HDR image generated by the inverse tone mapping method.

One can observe that large amounts of light in the output HDR image can be produced by a large amount of input pixels of the current input SDR image whose luminance value is intermediate (for example "180" versus the maximum input luminance "255") or smaller amount of input pixels whose luminance is high (i.e. around "250"). For example (using LMax="1000" nits), if we suppose that the gain function G( )=1.25 whatever the input luminance:

$Y_{HDR}(180)=368$ nits;

$Y_{HDR}(255)=1046$ nits.

Then an area centered on "255" will produce the same amount of light than an area centered on "180" but whose number of pixels is almost three times larger (indeed 1046=2.8*368). That means that the method has to search for lobes in the output HDR image and also for lobes of pixels (or population lobes) in the histogram.

Step 43 is detailed below in relation to FIG. 5.

In a step 400, the processing module determines if the diffuse white constraint is respected. Step 400 comprises sub-steps 44, 45 and 46.

In the step 44, the processing module 30 calculates a luminance value YposDW representative of at least one of the identified areas of the current input SDR image. An embodiment of step 44 is detailed in the following in relation to FIG. 6.

In the step 45, the processing module 30 computes an expanded luminance value YexpDW for the luminance value YposDW. Step 45 is detailed in the following in relation to FIG. 7.

In the step 46, the processing module determines, using the expanded luminance value YexpDW, if a diffuse white constraint is respected. To do so, the expanded luminance value YexpDW is compared to the diffuse white constraint value DWTarget. The diffuse white constraint value DWTarget is for example a predefined value that depends on the display device intended to display the HDR image corresponding to the current input SDR image and/or of an ambient light in a room where is displayed said HDR image and/or of a parameter given by a user to whom is intented the displayed HDR image.

If the expanded luminance value YexpDW is lower than or equal to the diffuse white constraint value DWTarget, the gain curve corresponding to the gain function G( ) (or equivalently the gain function G( )) is not modified and the ITMO function of equation 4 is used to generate the output HDR image in a step 47. Otherwise, if the expanded luminance value YexpDW is higher than the diffuse white constraint value DWTarget, a modified gain curve $\tilde{G}'$ (i.e. a modified version of the gain curve $\tilde{G}$ obtained with the gain function G( ) or equivalently a modified gain curve $\tilde{G}'$ obtained with a modified gain function G'( ) is defined and the luminance values $Y_{HDR}'$ obtained by the ITMO function of equation 4 are modified using said modified gain curve $\tilde{G}'$ to generate the output HDR image in a step 48. Step 48 is detailed in the following in relation to FIG. 8.

Figure 5:
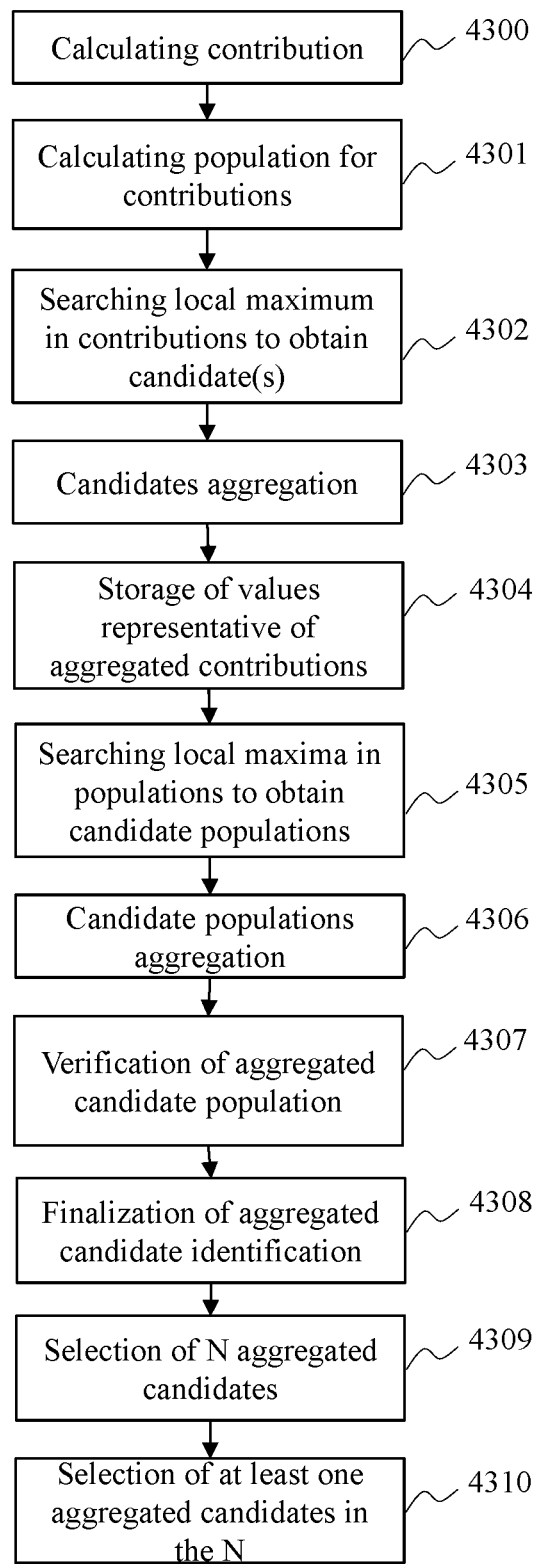
FIG. 5 illustrates schematically a detail of a first aspect of the method of improving an inverse tone mapping.

FIG. 5 illustrates schematically a detailed embodiment of step 43 of the method of inverse tone mapping.

In a step 4300, the processing module calculates a contribution (also called contrib or energy in the following) of each band of the histogram. A band is a group of consecutive bins of the histogram. In the example of a histogram comprising "256" bins, each band comprises four bins, the histogram being therefore divided in "64" bands of equal sizes. If the current input SDR image is coded on "10" bits, each bin contains four luminance values $Y_{SDR}'$. The first band of the histogram gathers the input luminance values $Y_{SDR}'$ from "0" to "15", the $32^{nd}$ band gathers the input luminance values $Y_{SDR}'$ from "496" to "511", and the $64^{th}$ band gathers the input luminance values $Y_{SDR}'$ from "1008" to "1023". A contribution of a band is representative of a light energy after application of the ITMO function of equation 4 emitted by pixels corresponding to said contribution, i.e. energy emitted by pixels represented by said band. The $n^{th}$ contrib is then defined as:

$$\text{Contrib}[n] = (\Sigma_i (\Sigma_j Y_{HDR}(j)) \times \text{histo}[i]) / (\text{sumOfBins} \times A) \quad \text{(eq. 5)}$$

with n varying from "0" to "63" and whereas:

i is an integer varying from n×nbOfBins/64 to (n+1)× nbOfBins/64−1.

A=(Ymax+1)/(nbOfBins), Ymax being the maximum possible code value of the input image;

j is in the range [A*i; A*(i+1)−1];

nbOfBins is the number of bins of the histogram (=256 in our example).

$Y_{HDR}$ is the linearized version of output luminance value $Y_{HDR}'$ computed with equation 4.

sumOfBins=Σhisto[k] where k is an integer variable varying from 0 to nbOfBins−1. sumOfBins represents the total number of pixels on which the histogram has been computed.

In the case where the input is encoded on "8" bits, equation 5 above can be simplified as follows:

$$\text{Contrib}[n]=\Sigma Y_{HDR}(j) \times \text{histo}[i]/\text{sumOfBins} \quad (\text{eq. 5'})$$

with n varying from "0" to "63".

In a variant of step 4300, contributions are calculated only for a subset of bands of the histogram, for example for one band in two or one band in three.

In a step 4301, the processing module 30 calculates a population (contribPop) for each contribution:

$$\text{contribPop}[n]=\Sigma \text{histo}[i] \quad (\text{eq. 6})$$

where i is an integer variable varying from n×nbOfBins/64 to (n+1)×nbOfBins/64−1.

In a step 4302, the processing module 30 identifies local maxima representative of areas of high energy in the set of contributions. A contribution contrib[n] of a band n is considered as a local maximum if its value is larger than the value of the contributions of its two neighboring bands (i.e. in general the band n−1 and the band n+1). In other words, the contribution contrib[n] is a local maximum if:

$$\text{contrib}[n] > \text{contrib}[n-1] \text{ and } \text{contrib}[n] > \text{contrib}[n+1]$$

Note that for the contribution of highest rank (here contrib[63], the condition is contrib[63]>contrib[62]. In the following, bands corresponding to contributions representing a local maximum are called candidates.

In a step 4303, the processing module 30 applies an aggregation process to the candidates. During the aggregation process, the band corresponding to each candidate is aggregated with a maximum of LN neighboring bands on the left and a maximum of RN neighboring bands on the right (which make a total max width of LN+RN+1) as follows:

For the LN neighboring bands on the left, the processing module 30 searches the smallest ln value in [1; LN] that fulfils:
contrib[n−ln]>0.2×contrib[n] and;
contrib[n−ln]<1.025×contrib[n−ln+1].
If none is found, then ln=0.
Similarly, for the RN neighboring bands on the right, the processing module 30 searches the smallest rn value in [1; RN] that fulfils:
contrib[n+rn]>0.2×contrib[n] and;
contrib[n+rn]<1.025×contrib[n+rn−1].
with ln+rn≤63. If none is found, then rn=0.
The aggregation is made between n−ln and n+rn.
In an embodiment LN=RN=5.

The aggregation of bands around candidate is motivated by the fact that large bright areas (as clouds in the sky, a close-up of a page in a book, characters with clear clothes, white animals and so on) are not uniformly white, but in general exhibit some dispersion around a middle value, which can be characterized by a lobe with a certain width.

Note that the values "0.2" and "1.025" are examples and can be changed to other close values.

In a step 4304, the processing module 30 stores for each candidate information representative of this candidate. In an embodiment, said stored information comprises the lowest and highest positions of the aggregated bands in the histogram, as well as the sum of the contribution of the aggregated bands, which is named the energy of the candidate.

In a step 4305, the processing module 30 searches local maxima in the populations contribPop associated to the contributions (calculated in step 4301). A population contribPop[n] is a local maximum if it respects the following conditions:

$$\text{contribPop}[n] > \text{contribPop}[n-1] \text{ and contribPop}[n] > \text{contribPop}[n+1]$$

Note that for the population of highest rank (here contribPop[63]), the condition is contribPop[63]>contribPop[62].

In a step 4306, the processing module 30 applies an aggregation process to the bands (called candidatePop) corresponding to the local maxima identified in the populations contribPop. The aggregation process applied during step 4306 on the candidatePop is identical to the aggregation process applied during step 4303 on the candidates.

In a step 4307, the processing module 30 verifies if at least one aggregated candidate populations candidatePop is independent of any identified aggregated candidate. Independent means that this aggregated candidate population don't share any contribution position with any identified aggregated candidate.

If at least one independent aggregated candidate populations candidatePop exists, in a step 4308, the processing module 30 finalize the aggregated candidates identification by specifying that each independent aggregated candidate population candidatePop is an aggregated candidate, i.e. for each independent aggregated candidate population, the processing module 30 creates an aggregated candidate from said independent aggregated candidate population. This can happen when the energy is slightly increasing up to a maximum of energy located farther in terms of higher luminance value. Nevertheless, this area can embed a large number of pixels surrounding the candidate population candidatePop, and potentially representing a large amount of energy.

In a step 4309, once all aggregated candidates have been identified, the processing module 30 selects a number N_cand of aggregated candidates having the highest energy from the identified aggregated candidates. In other words, in step 4309, the processing module selects the N_cand aggregated candidates comprising pixels emitting the most light energy. In an embodiment, the number N_cand=5. For each of the N_cand selected aggregated candidates, the processing module 30 stores information representative of this selected aggregated candidate comprising for example:

a lowest position of the aggregated candidate, named loPos (i.e. corresponding to the value n−nr defined above);
a highest position of the aggregated candidate, named hiPos (i.e. corresponding to the value n+h defined above);
a position of a center of the aggregated candidate, named maxEnergyPos, i.e. the position of the candidate itself (i.e. the value n as defined above);
an information representative of an energy of the aggregated candidate, named energy (i.e. the sum of all the contribution in the aggregate candidate);
a population of the aggregated candidate (i.e. the sum of all the bins of the histogram included in the aggregated candidate from position loPos to position hiPos divided by sumOfBins), named population.

In a step 4310, the processing module 30 selects N_cand_Max_Pop (N_cand_Max_Pop>1 and N_cand_Max_Pop<N_cand) aggregated candidates with the largest population in the set of N_cand selected aggregated candidates.

In an embodiment, N_cand_Max_Pop=2. In that case, if the two aggregated candidates (noted CP1 and CP2 in the following) selected in step 4310 overlaps, i.e.:

loPos[CP1]<hiPos[CP2] if maxEnergyPos[CP1]>maxEnergyPos[CP2]; or, loPos[CP2]<hiPos[CP1] if maxEnergyPos[CP1]<maxEnergyPos[CP2];

the two aggregated candidates are merged (i.e. energy and population are merged), and the processing module 30 selects the aggregated candidate with the third population in the N_cand selected aggregated candidates.

As can be seen, the processing module 30, when applying the process of FIG. 5, selects the N_cand_Max_Pop largest areas in term of population (i.e. the number of pixels) among the N_cand largest areas in term of energy: this follows the idea above that large amounts of light in the output HDR image can be produced by a large amount of input pixels. By finding the N_cand first aggregated candidates in term of energy, the processing module 30 obtains the N_cand main lobes and then selects the N_cand_Max_Pop ones which gather the maximum number of pixels. Note that the N_cand first energy lobes can be small (and even inexistent) as well as the N_cand_Max_Pop first populations: it will be the case if the input image is a dark one.

As will be described in the following, the N_cand_Max_Pop aggregated candidates are used to determine if the diffuse white constraint risk to be not respected by the output HDR image if the ITMO function with the gain function G( ) is applied to the current input SDR image. The N_cand_Max_Pop aggregated candidates are therefore used to determine when modifying the gain function G( ) (or equivalently, the gain curve $\tilde{G}$ obtained using the gain function) to insure the output HDR image respects the predefined light energy constraint (Diffuse White).

Figure 6:
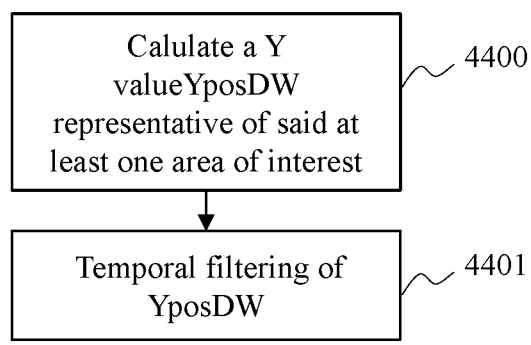
FIG. 6 illustrates schematically a detail of a second aspect of the method of improving an inverse tone mapping.

FIG. 6 illustrates schematically a detailed embodiment of step 44 of the method of inverse tone mapping.

In a step 4400, the processing module 30 determines a luminance value YposDW representative of the selected N_cand_Max_Pop candidates with the largest population.

When N_cand_Max_Pop=2, the processing module 30 applies the following algorithm to determine the luminance value YposDW:

in the band corresponding to the position maxEnergyPos of CP1 (which contains four bins in the previous example in which the histogram comprises "64" consecutive bands of equal size and "256" bins), searching for the input luminance value $Y_{in}$ whose bin in the histogram is the highest, and name this input luminance value firstPopY.

in the band corresponding to the position maxEnergyPos of CP2, searching for the input luminance value $Y_{in}$ whose bin in the histogram is the highest, and name input luminance value secondPopY.

determining the luminance value YposDW as follows:

YposDW=firstPopY+EnByPopCoef×(secondPopY−firstPopY)   (eq. 7)

where

EnByPopCoef=secondEnByPop/(firstEnByPop+secondEnByPop);

firstEnByPop=(energy[$CP1$]×population[$CP1$])$^{0.5}$;

secondEnByPop=(energy[$CP2$]×population[$CP2$])$^{0.5}$;

The luminance value YposDW is therefore located somewhere between the two largest areas of pixels among the ones which have the highest energy.

In the above embodiment of step 4400, the parameter EnByPopCoef (and therefore the luminance value YposDW) depends on a square root of a product of the energy by the population of the N_cand_Max_Pop(=2) candidates. In the above equation 7, the population and the energy have the same weight.

In another embodiment of step 4400, more weight is given to the population as follows:

firstEnByPop=energy[$CP1$]$^{0.25}$×population[$CP1$]$^{0.75}$;

secondEnByPop=energy[$CP2$]$^{0.25}$×population[$CP2$]$^{0.75}$;

In another embodiment of step 4400, more weight is given to the energy as follows:

firstEnByPop=energy[$CP1$]$^{0.75}$×population[$CP1$]$^{0.25}$;

secondEnByPop=energy[$CP2$]$^{0.75}$×population[$CP2$]$^{0.25}$;

When N_cand_Max_Pop=1, i.e. only one candidates CP1 with the largest population is determined in the set of N_cand selected candidates, the processing module 30 applies the following algorithm to determine the luminance value YposDW:

in the band corresponding to the position maxEnergyPos of CP1, searching for the input luminance value $Y_{in}$ whose bin in the histogram is the highest, and name this input luminance value firstPopY.

determining the luminance value YposDW as follows:

YposDW=firstPopY   (eq. 7bis)

Optionally (for example, in an embodiment adapted to current input SDR images extracted from a video sequence), in a step 4401, the processing module 30 applies a temporal filter to the luminance value YposDW. The purpose of the optional step 4401 is to attenuate (or even cancel) small luminance variations (or oscillations) between two consecutive HDR images. The temporal filtering process consists in computing a weighted average between the luminance value YposDW and a luminance value representative of luminance values YposDW computed for images preceding the current input SDR image and noted recursiveYposDW. The luminance values YposDW and recursiveYposDW are computed as follows:

$$recursiveYposDW = \qquad\qquad\qquad\qquad\text{(eq. 8)}$$

$$DWFeedBack \times recursiveYposDW + (1 - DWFeedBack) \times YposDW;$$

$$YposDW = recursiveYposDW;$$

where DWFeedBack is a weight in the range [0; 1]. In an embodiment DWFeedBack=0.9. In another embodiment DWFeedBack depends on the frame rate of the video sequence. The higher the frame rate is, the higher the weight DWFeedBack is. For example, for a frame rate of "25" images per seconds (Im/s), DWFeedBack=0.95 while for a frame rate of "100" Im/s, DWFeedBack=0.975.

Note that the filtering is not applied if the current input SDR image correspond to a scene cut (i.e. a part of the video sequence that is not homogeneous in terms of content with images preceding the current input SDR image).

Note that the luminance value YposDW obtained in step 4400 (or step 4401 if applied) is a floating-point number in the range [0; 255] and can be easily scaled to the number of bits of the current input SDR image:

$$YposDW = YposDW \times (Ymax/255)$$

where $Ymax = 2^n - 1$ of the input video is coded on n bits (i.e. Ymax=1023 if n=10).

Figure 7:
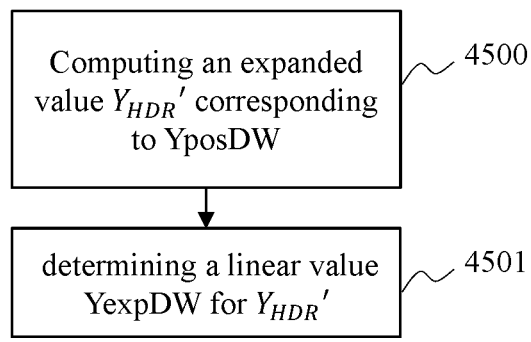
FIG. 7 illustrates schematically a detail of a third aspect of the method of improving an inverse tone mapping.

FIG. 7 illustrates schematically a detail of step 45 of the method of inverse tone mapping.

In a step 4500, the processing module 30 computes an expanded value $Y_{HDR}'$ corresponding to the luminance value YposDW as follows:

$$Y'_{HDR}(YposDW) = (YposDW \times (Ymax/255))^{G(YposDW)}$$

and, in a step 4501, applies a linearization to the obtained value:

$$YexpDW = (Y'_{HDR}(YposDW)/LMax)^{2.4} \times LMax$$

Figure 8:
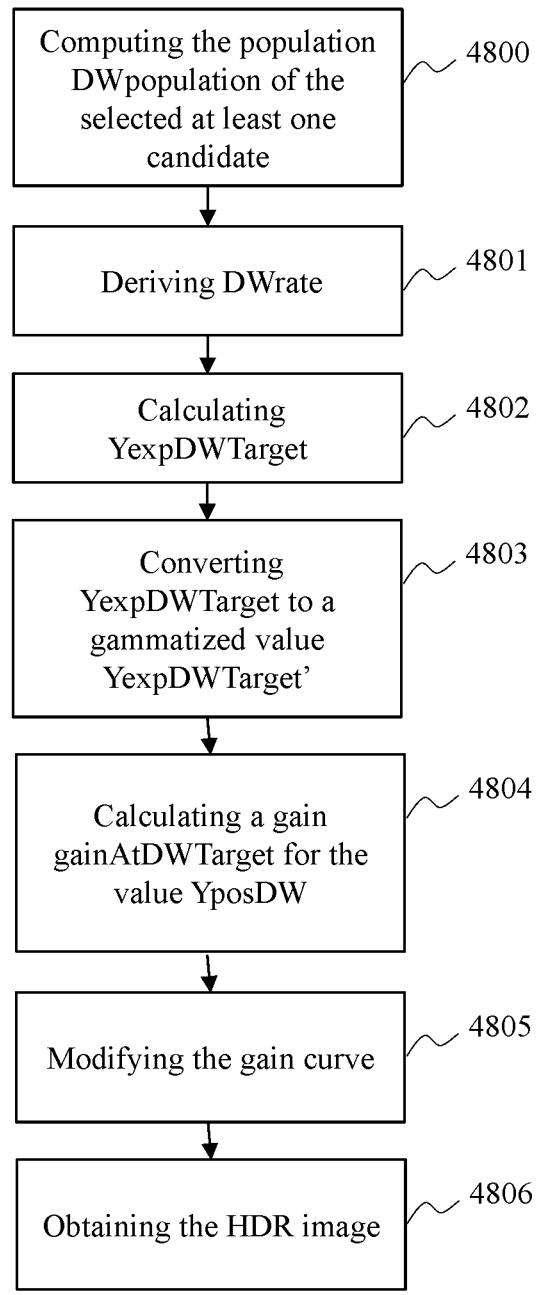
FIG. 8 illustrates schematically a detail of a third aspect of the method of improving an inverse tone mapping.

FIG. 8 illustrates schematically a detail of step 48 of the method of inverse tone mapping. As a reminder, step 48 is executed when the processing module has determined in step 46 that the inverse tone mapping applied using the gain function G( ) to the current input SDR image risk to generate an output HDR image comprising areas that are too bright. The purpose of step 48 is to reduce the brightness of such areas of the HDR image.

In a step 4800, the processing module 30 determines the population DWpopulation of the selected N_cand_Max_Pop candidates with the largest population.

When $N\_cand\_Max\_Pop=2$,
DWpopulation=population(*CP*1)+population
(*CP*2)          (Eq. 10).

When $N\_cand\_Max\_Pop=1$,
DWpopulation=population(*CP*1)          (eq. 10bis).

The more DWpopulation is high, the more YexpDW must be close to DWTarget. For example, a bright sun in the sky whose size is "1%" of the image size, must be ignored (indeed in that case for example, there is no risk of dazzling a user watching the video), while a bright ice rink whose size is "60%" of the image size can be locked on DWTarget.

Two parameters are then introduced:
A parameter loThresholdPop: if DWpopulation<loThresholdPop, the gain at YposDW is kept as is. That means that if DWpopulation represents less than loThresholdPop % of the total number of pixels, the gain curve G (or equivalently the gain function GO) is not modified and the step 47 is applied. In an embodiment, loThresholdPop is a predefined value. For example loThresholdPop=5%.
A parameter DWsensitivity in the range [0 . . . 1]: DWsensitivity defines another threshold hiThresholdPop above which the gain curve $\tilde{G}$ (or equivalently the gain function GO) at the luminance value YposDW is modified in order to have YexpDW=DWTarget.

The variables loThresholdPop and DWsensitivity are used to compute a variable modDWpopulation:

modDWpopulation=(DWpopulation−loThreshold-
Pop)/(0.65−0.4×DWsensitivity)          (eq. 11)

with modDWpopulation restricted to the range [0; 1].

As can be seen, if DWpopulation<loThresholdPop, modDWpopulation=0. Consequently, modDwpopulation=0 indicates that there is no need to modify the gain curve $\tilde{G}$ (or equivalently the gain function GO) to obtain the HDR image from the current input SDR image.

Regarding DWsensitivity:
DWsensitivity=0 induces hiThresholdPop=0.7: DWpopulation must represent at least 70% of the pixels of the image to have finally YexpDW=DWTarget. In that case, the inverse tone mapping method and in particular the process of modifying the gain curve (or equivalently the gain function GO) has a low reactivity to DWpopulation.
DWsensitivity=0.5 induces hiThresholdPop=0.5. DWpopulation must represent at least 50% of the pixels of the image to have finally YexpDW=DWTarget.
DWsensitivity=1 induces hiThresholdPop=0.3. DWpopulation must represent at least 30% of the pixels of the image to have finally YexpDW=DWTarget. In that case, the inverse tone mapping method and in particular the process of modifying the gain curve $\tilde{G}'$ (or equivalently the gain function GO) is very reactive to DWpopulation.

In a step 4801, the processing module 30 derives a variable DWrate from the variable modDWpopulation:

$$DWrate = modDWpopulation^{1/p} \text{ with } p \geq 1. \quad (eq.~12)$$

In a step 4802, the processing module 30 determines a value YexpDWTarget as follows:

YexpDWTarget=DWrate*DWTarget+(1−DWrate)*
YexpDW          (eq. 13)

where YexpDWTarget and YexpDW are linear values.

Consequently, the more DWpopulation is high, the more the expanded value of the luminance value YposDW is close to the diffuse white target DWtarget.

When N_cand_Max_Pop=2, if the population of CP1 is much higher than the population of CP2, then the luminance value YposDW is closer to the position firstPopY, and then the pixels inside the lobe CP1 have their HDR value closer to the diffuse white target DWtarget depending on the size of the lobe CP1.

As can be seen:
if DWrate=0, then YexpDWTarget is equal to the luminance value YexpDW which means that the gain curve $\tilde{G}$ (or equivalently the gain function G( )) doesn't have to be modified. In that case, step 47 is executed by the processing module 30.
if DWrate=1, YexpDWTarget is equal to the diffuse white target DWTarget which means that the gain curve $\tilde{G}$ (or equivalently the gain function G( )) must be modified in order to obtain DWTarget for the luminance value YposDW.

In a step 4803, the processing module 30 converts the value YexpDWTarget to a gammatized value:

$$YexpDWTarget' = (YexpDWTarget/LMax)^{1/2.4} \times LMax$$

In a step 4804, the processing module computes a gain gainAtDWTarget corresponding to the luminance value YposDW:

gainAtDWTarget=log(YexpDWTarget')/log(255/
*Y*max×YposDW)          (eq. 14)

In a step 4805, the processing module modifies the gain curve $\tilde{G}$ obtained with the gain function G( ) as a whole to obtain a new gain curve $\tilde{G}'$. Several variants of step 4805 are possible:
1. modifying the gain curve $\tilde{G}$ only in the high input luminance values, while ensuring that the $Y_{HDR}'$ curve (obtained with equation 4) is monotonous. This embodiment can nevertheless introduce a kind of clipping in the high luminance values of the $Y_{HDR}'$ curve if a lot of high input luminance values take a same output luminance value;

2. modifying the gain curve $\tilde{G}$ on all the input values by subtracting a constant from the gain curve $\tilde{G}$, while ensuring that the $Y_{HDR}'$ curve doesn't produce a too dark image;
3. a mix of the two first solutions.

Variant 1 can be viewed as a compression of the gain curve $\tilde{G}$ in the high level of $Y_{in}$, producing a compression only for the highest $Y_{HDR}'$ levels. In embodiment 1 of step 4805, a modified gain curve $\tilde{G}'$ can be obtained using the following equation:

$$\text{gainMod}(Y') = G(Y') - \text{HlCoef} \times (Y'/Y\text{max})^{HlExp} \quad (eq.\ 15)$$

gainMod(Y') means "modified gain of the gammatized input luminance value Y'", HlExp is called high levels Exponent and HlCoef is called high levels coefficient.

In an embodiment the high levels exponent HlExp=6, but it can be lowered while staying above "2". In an embodiment, the high levels coefficient HlCoefis in the range [0; 0.3]. HlCoef=0 means that no compression is applied. HlCoef is computed by using in equation 15 the known values of gain G(YposDW) and gainMod(YposDW) at with HlExp=6.

We introduce then a notion of contrast in the way the gain curve is compressed.

In the variant 1, the contrast is "0" (minimum contrast). The equation 15 is applied provided that after compression, and for a "10" bits current input SDR image, the expanded output for the luminance value "1023" is higher than the one for the luminance value "1020":

$$\left(\left(\frac{1020}{1023}\right) \times 255\right)^{gainMod(1020)} < \left(\left(\frac{1023}{1023}\right) \times 255\right)^{gainMod(1023)} \quad (eq.\ 16)$$

If it is not the case, HlExp in equation 15 is recursively reduced using a given reduction parameter RedParam, for example RedParam=0.05, which produces a higher value for HlCoef until equation 16 is true. Then if HlExp<2, HlExp is clipped to "2", or if HlCoef<0.3, HlCoef is clipped to "0.3", and a value c0 is computed to have:

$$\text{gainMod}(YposDW) = G(YposDW) - \text{HlCoef} \times (YposDW/Y\text{max})^{HlExp} + C0 \quad (eq.\ 17)$$

c0 must be a negative number. c0 is equal to "0" if HlExp≥2 and HlCoef≥0.3. Notice that other values can be chosen for the maximum value of HlCoef and for the starting value and minimum value of HlExp.

In the variant 2, the contrast is 1 (maximum contrast). The equation 15 is applied provided that after compression, and for a "10" bits current input SDR image, the gain for the luminance value "1023" is higher than the one for luminance value "1020":

$$\text{gainMod}(1020) < \text{gainMod}(1023) \quad (eq.\ 18)$$

If it is not the case, a new value HlCoef1 is found using equation 15 for which gainMod(1020)=gainMod (1023). HlCoef1 is lower than the previous value HlCoef A value c1 is then computed using HlCoef1 and YposDW in the following equation 19 (HlExp1=6):

$$\text{gainMod}(YposDW) = G(YposDW) - \text{HlCoef1} \times (YposDW/Y\text{max})^{HlExp1} + C1 \quad (eq.\ 19)$$

c1 is a negative number. c1 is equal to "0" if equation 18 is verified.

The variant 3 can be implemented using both contrast "0" and "1" by introducing new values of contrast contrast in the range]0 . . . 1[. Then, c and Hlcoef are computed as follows (equation 20):

$$c = \text{contrast} \times c1 + (1-\text{contrast}) \times c0$$

$$\text{Hlcoef} = \text{contrast} \times \text{Hlcoef1} + (1-\text{contrast}) \times \text{Hlcoef0}$$

And then HlExp can be found using equation 17 at position YposDW:

$$\text{gainMod}(YposDW) = G(YposDW) - \text{HlCoef} \times (YposDW/Y\text{max})^{HlExp} + C$$

and then:

$$c = \log((G(YposDW) + c - \text{gainMod}(YposDW))/\text{HlCoef})/ \log(YposDW/Y\text{max}) \quad (eq.\ 21)$$

provided that YposDW is not Ymax. If YposDW=Ymax, the value can be found for Ymax−1.

In order to avoid pumping effects, HlCoef, HlExp and c can be temporally filtered in the same way than YposDW (i.e. in step 4401) (but possibly with a different feedback value). Another and even better way of temporal filtering is to apply the feedback on the gain function G0 itself. In both cases, the temporal filtering is reset at each cut position in the same way YposDW is.

Until now, embodiments dealing with a goal of respecting a diffuse white constraint has been described in relation to FIG. 4 to 8. In the following, we show that similar embodiments can deal with a goal of respecting a MaxFall constraint.

The MaxFall MF of an image can be defined as follows:

$$MF = (\Sigma \max(Rp, Gp, Bp))/\text{nbOfPixelsInTheImage}$$

where Rp, Gp and Bp are the three linear color components values of a pixel P, and nbOfPixelsInTheImage is the number of pixels in the image.

In the following, this definition is approximated with the following formula (which is quite correct because this invention deals with bright regions, then regions where luminance is high or very high which supposes that at least two of the three RGB color components values are close):

$$MF = (\Sigma Y_P)/\text{nbOfPixelsInTheImage}$$

where $Y_P$ is the linearized luminance of the pixel P obtained from a gammatized luminance $Y_P'$ of the pixel P:

$$Y_P = Y_P'^{2.4} \times L\text{Max}$$

where $Y_P'$ is a value in the range [0; 1], and LMax is the peak nit of the target display. $Y_P'$ can also be a code value encoded on n bits, and in this case:

$$Y_P = \left(\frac{Y_P'}{Y_{max}'}\right)^{2.4} \times L\text{Max} \text{ with } Y_{max}' = 2^n - 1$$

For example, an SDR input gammatized luminance value $Y_P'=100$ coded on "8" bits has a linear value of "10.6" nits. An HDR output luminance value Yexp'$_P$=400 coded on "10" bits and produced for a "1000" cd/m2 (nominal peak luminance) display device has a linear value of "105" nits.

In the following, a value MFTarget represents the maximum value that the MaxFall of the expanded image can take. That means that the calculated MaxFall of the expanded image must be lower than MFTarget. If the calculated MaxFall is higher than MFTarget, then the gain function is modified in order to reach this value. The MaxFall constraint value MFTarget is for example a predefined value that depends on the display device intended to display the HDR image corresponding to the current input SDR image and/or of an ambient light in a room where is displayed said HDR image and/or of a parameter given by a user to whom is intented the displayed HDR image.

The calculation of the MaxFall of the expanded image, namely MaxFallOut, is simplified by using the content of the histogram:

$$\text{MaxFallOut} = (\Sigma_i(\Sigma_j Y_{HDR}(j)) \times \text{histo}[i])/(\text{sumOfBins} \times A) \quad \text{(eq. 22)}$$

Where:
i is in the range [0; nbOfBins];
A=(Ymax+1)/(nbOfBins), Ymax being the maximum possible code value of the input image;
j is in the range [A*i; A*(i+1)−1];
$Y_{HDR}$ (j) is a linear luminance (expressed in nits).

As can be seen MaxFallOut is equal to the sum of the "64" contrib[n] (noted ($\Sigma$contrib[n]) defined in equation 5 (i.e. MaxFallOut=$\Sigma$contrib[n]).

Figure 10:
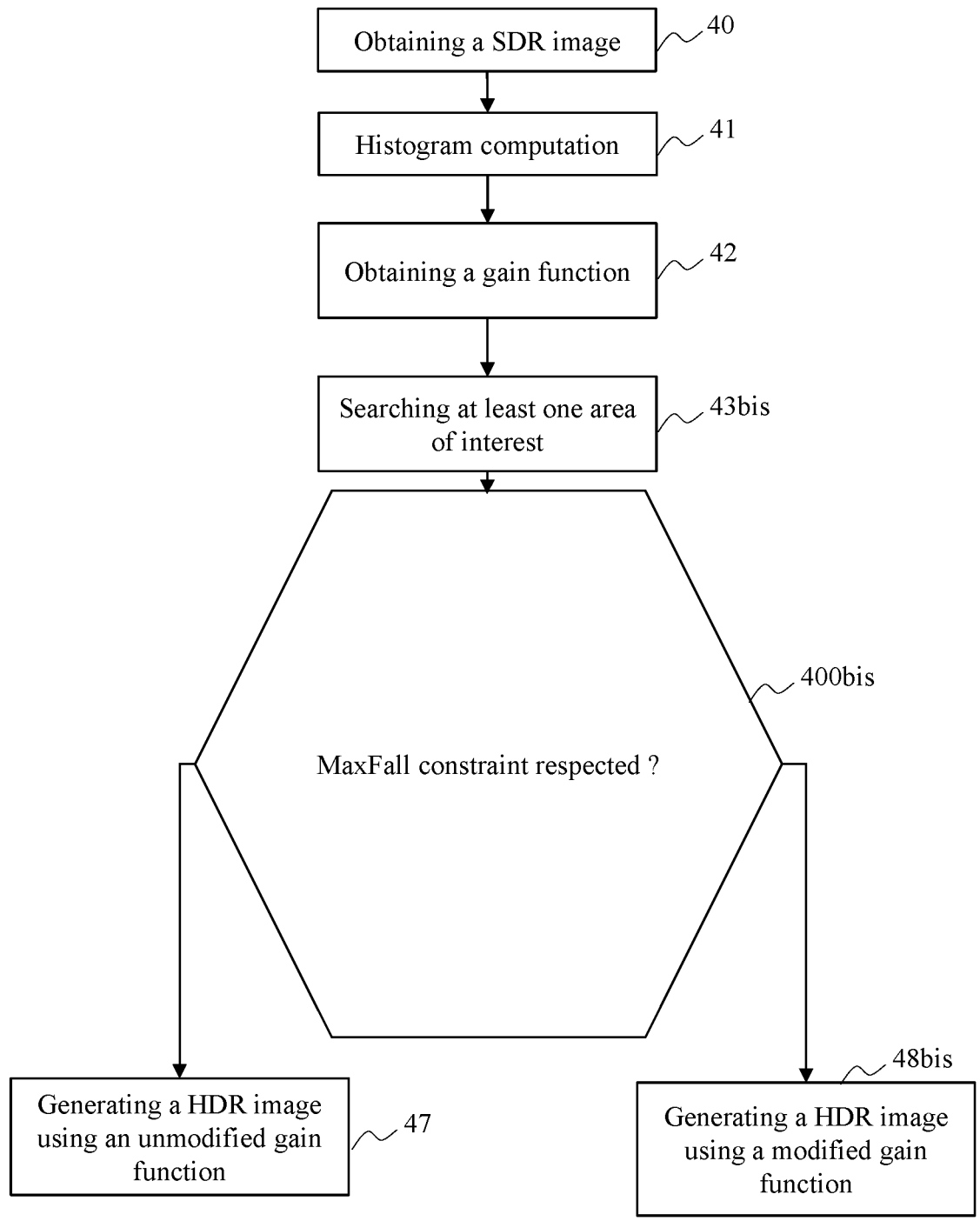
FIG. 10 illustrates schematically a high-level representation of various second embodiments of a method of improving an inverse tone mapping.

FIG. 10 illustrates schematically a high-level representation of various second embodiments of a method of inverse tone mapping. An objective of the embodiments of FIG. 10 is to respect a MaxFall constraint.

The method of FIG. 10 is executed by the processing module 30.

The method of FIG. 10 differs from the method of FIG. 4 in that the steps 43, 400 and 48 are respectively replaced by steps 43bis, 400bis and 48bis. Other steps remain identical.

Comparing to step 43, in step 43bis steps 4301, 4305, 4306, 4307, 4308 and 4310 are not executed. In step 4309, the processing module 30 selects the aggregated candidates having the highest energy from the identified aggregated candidates.

In the step 400bis, the processing module 30 compares a value representative of the MaxFall of the expanded HDR image to the MaxFall constraint MFTarget. During step 400bis, it is considered that the sum $\Sigma$contrib[n] of the contributions contrib[n] calculated during step 4300 is representative of the MaxFall of the expanded HDR image.

If the sum of all the contributions $\Sigma$contrib[n] is lower than or equal to MFTarget, the gain function G( ) (or equivalently the gain curve $\tilde{G}$) doesn't have to be modified (i.e. step 47 is executed).

On the contrary, if the sum of all contributions $\Sigma$contrib[n] is higher than MFTarget, during step 48bis the processing module 30 uses the candidate CP1 (as defined in relation to FIG. 5) with the highest energy, searches for the luminance value $Y_{in}$ with the highest energy in candidate CP1 (called $Y_{pos}$ in the following), and modifies the expansion gain corresponding to the luminance value $Y_{pos}$ as follows:

$$\text{gainAtMFTarget} = G(Y_{pos}) + \log(\text{MFTarget}/\text{MaxFallOut})/(2.4*\log(255 \times Y_{pos}/Y\max)) \quad \text{(eq. 23)}$$

$Y_{pos}$ and $Y_{max}$ being code words which are then gammatized. If the histogram contains "256" bins, $Y_{pos}$ is the highest input luminance value $Y_{in}$ in the bin of the maxEnergyPos of CP1 (which contains the maximum energy).

The processing module 30 then uses equation 15 to find a modified gain gainModMF($Y_{pos}$) at $Y_{pos}$ position:

$$\text{gainAtMFTarget} = G(Y_{pos}) - \text{HlCoef} \times (Y_{pos}/Y\max)^{HlExp} = \text{gainAtMFTarget}$$

The processing module then applies the same strategy as the one used for respecting the diffuse white constraint regarding the modification of the gain curve or equivalently the gain function G( ) (i.e. using the same contrast notion), using equations 16 to 22 and replacing gainMod and YposDW respectively by gainModMF and Ypos to find the three values of HlCoef HlExp and c.

In an embodiment, only the method of FIG. 4 focusing on the diffuse white constraint is applied during the inverse tone mapping of the current input SDR image.

In an embodiment, only the method of FIG. 10 focusing on the MaxFall constraint is applied during the inverse tone mapping of the current input SDR image.

In an embodiment, both method of FIGS. 4 and 10 are applied during the inverse tone mapping of the current input SDR image. In an embodiment, the method of FIG. 4 is applied before the method of FIG. 10. Indeed, if the method of FIG. 4 intended to respect the diffuse white constraint is applied on the current input SDR image, the resulting image can nevertheless have a MaxFall higher than MFTarget. In this case, a triplet (HlCoef HlExp, c) has been found which follows:

$$\text{gainAtDWTarget} = G(\text{YposDW}) - \text{HlCoef} \times (\text{YposDW}/Y\max)^{HlExp} + c$$

(HlCoef HlExp, c) are then modified to (HlCoef', HlExp', c') in order to have:

$$\text{gainAtMFTarget} = G(Y_{pos}) - \text{HlCoef}' \times (Y_{pos}/Y\max)^{HlExp'} + c'$$

while following the rule above regarding the contrast.

The embodiments described above deal with bright regions. Nevertheless, the MaxFall detection can be extended to large saturated blue or red regions, which can produce large MaxFall values while their corresponding luminance value Y is relatively low. This can be solved by using blue and red histograms (blue and red values can be computed from the Y, U and V values). When using a 709 color space (as defined in recommendation UIT-R BT 709), the distribution of R (red), B (blue) and G (green) components is done as follows:

R is 21% of Y
G is 72% of Y
B is 7% of Y

Large whitish areas lead to lobes in the luminance (Y) histogram. They shall also lead to lobes located roughly at the same position in the R and B histograms. On the contrary, having large lobes in the high values of the R and/or B histograms without any lobe at the same location in the Y histogram (which means that equivalent size Y lobes are present for lower values of Y) will lead to a large value of the RGB MaxFall (RGB MaxFall being here the actual definition of the MaxFall) while the MaxFall computed on Y is small or at least smaller. The method used to find the population candidates on Y can be used on R and B, and then a matching between the Y aggregated population and the R and/or B ones located at a different position can be done. The energy of those matched population candidates can then be over-evaluated by taking the fact that they lack green into account, and then the whole set of standard Y candidates and over-evaluated Y candidates can be sorted. The MaxFall calculation is then done at the candidate having the highest energy.

We described above a number of embodiments. Features of these embodiments can be provided alone or in any combination. Further, embodiments can include one or more of the following features, devices, or aspects, alone or in any combination, across various claim categories and types:

A TV, set-top box, cell phone, tablet, or other electronic device that performs at least one of the embodiments described.

A TV, set-top box, cell phone, tablet, or other electronic device that performs at least one of the embodiments described, and that displays (e.g. using a monitor, screen, or other type of display) a resulting image.

A TV, set-top box, cell phone, tablet, or other electronic device that tunes (e.g. using a tuner) a channel to receive a signal including an encoded image or video stream, and performs at least one of the embodiments described.

A TV, set-top box, cell phone, tablet, or other electronic device that receives (e.g. using an antenna) a signal over the air that includes an encoded image or video stream, and performs at least one of the embodiments described.

The invention claimed is:

1. A method comprising:

obtaining a gain function used for obtaining an inverse tone mapping operator function, allowing obtaining a High Dynamic Range image, from a low dynamic range image by applying a search process to identify areas of the low dynamic range image producing bright areas in the high dynamic range image when the inverse tone mapping operator function is applied on the low dynamic range image, the search process comprising:

defining bands representing subparts of a histogram of the low dynamic range image and obtaining a contribution and a population representing a number of pixels of each band, each contribution being representative of a light energy after application of the inverse tone mapping operator function emitted by pixels represented by the band;

creating at least one candidate from at least one local maximum in the contributions and at least one local maximum in the populations;

selecting at least one final candidate from the at least one candidate in function of information representative of each candidate comprising an information representative of a light energy emitted by pixels represented by the candidate and of the number of pixels represented by the candidate; and applying a determination process comprising:

determining a final pixel value representative of the at least one final candidate;

computing a value representative of an expanded pixel value from the final pixel value using the inverse tone mapping operator function; and executing a modification process adapted to modify the gain function responsive to determining that the expanded pixel value is higher than a light energy constraint representing a predefined diffuse white constraint value.

2. The method of claim 1, wherein creating at least one candidate from at least one local maximum in the contributions and at least one local maximum in the populations comprises:

identifying at least one local maximum in the contributions and for each local maximum, aggregating the corresponding band with neighboring bands to create a candidate;

identifying at least one local maximum in the populations and for each local maximum, aggregating the corresponding band with neighboring bands to create a candidate population; and creating a candidate from each candidate population that is independent of any candidate.

3. The method of claim 1, wherein the at least one light energy constraint comprises a MaxFall constraint.

4. The method of claim 1, wherein selecting at least one final candidate comprises:

selecting a subset of candidates associated with a highest value of information representative of a light energy, the at least one final candidate being selected from the candidates of the subset representing a highest number of pixels.

5. The method of claim 1, wherein the low dynamic range image is a current image of a sequence of images and the final pixel value is temporally filtered using at least one final pixel value computed for at least one image preceding the current image in the sequence of images.

6. The method of claim 1, wherein the determination process comprises:

executing a modification process adapted to modify the gain function responsive to determining that a value representative of a MaxFall of the high dynamic range image is higher than a light energy constraint representing a predefined MaxFall constraint.

7. The method of claim 6, wherein the value representative of the MaxFall of the high dynamic range image is a sum of the contributions.

8. A non-transitory computer readable medium storing program code instructions for implementing the method according to claim 1.

9. A device comprising electronic circuitry adapted for:

obtaining a gain function used for obtaining an inverse tone mapping operator function, allowing obtaining a High Dynamic Range image from a low dynamic range image by applying a search process to identify areas of the low dynamic range image producing bright areas in the high dynamic range image when the inverse tone mapping operator function is applied on the low dynamic range image, the search process comprising:

defining bands corresponding to subparts of an histogram of the low dynamic range image and obtaining a contribution and a population representing a number of pixels of each band, each contribution being representative of a light energy after application of the inverse tone mapping operator function emitted by pixels represented by the band;

creating at least one candidate from at least one local maximum in the contributions and at least one local maximum in the populations;

selecting at least one final candidate from the at least one candidate in function of information representative of each candidate comprising an information representative of a light energy emitted by pixels represented by the candidate and of the number of pixels represented by the candidate; and applying a determination process comprising:

determining a final pixel value representative of the at least one final candidate;

computing a value representative of an expanded pixel value from the final pixel value using the inverse tone mapping operator function; and executing a modification process adapted to modify the gain function responsive to determining that the expanded pixel value is higher than a light energy constraint representing a predefined diffuse white constraint value.

10. The device of claim 9, wherein creating at least one candidate from at least one local maximum in the contributions and at least one local maximum in the populations comprises:

identifying at least one local maximum in the contributions and for each local maximum, aggregating the corresponding band with neighboring bands to create a candidate;

identifying at least one local maximum in the populations and for each local maximum, aggregating the corresponding band with neighboring bands to create a candidate population; and creating a candidate from each candidate population that is independent of any candidate.

11. The device of claim 9, wherein the at least one light energy constraint comprises a MaxFall constraint.

12. The device of claim 9, wherein for selecting at least one final candidate, the electronic circuitry is further adapted for:

selecting a subset of candidates associated with a highest value of information representative of a light energy, the at least one final candidate being selected from the candidates of the subset representing a highest number of pixels.

13. The device of claim 9, wherein the low dynamic range image is a current image of a sequence of images and the final pixel value is temporally filtered using at least one final pixel value computed for at least one image preceding the current image in the sequence of images.

14. The device of claim 9, wherein for applying the determination process, the device is further configured for:

executing a modification process adapted to modify the gain function when a value representative of a MaxFall of the high dynamic range image is higher than a light energy constraint representing a predefined MaxFall constraint.

15. The device of claim 14, wherein the value representative of a MaxFall of the high dynamic range image is a sum of the contributions.

\* \* \* \* \*